United States Patent [19]

Mahoney et al.

[11] Patent Number: 4,526,675

[45] Date of Patent: Jul. 2, 1985

[54] HYDROCARBON CONVERSION METHOD

[75] Inventors: John A. Mahoney, Glen Ellyn, Ill.; Regis J. Pellet, Croton-on-Hudson, N.Y.; John J. Helstrom, Naperville, Ill.

[73] Assignee: Standard Oil Company (Indiana), Chicago, Ill.

[21] Appl. No.: 498,229

[22] Filed: May 26, 1983

[51] Int. Cl.³ .................. C10G 1/08; C10G 47/02
[52] U.S. Cl. .................................... 208/10; 208/112; 208/216 PP; 585/240
[58] Field of Search .............. 208/10, 112, 216 PP; 585/240, 241

[56] References Cited

U.S. PATENT DOCUMENTS

| | | | |
|---|---|---|---|
| 3,663,452 | 5/1972 | Kiovsky et al. | 208/10 |
| 3,725,239 | 4/1973 | Kiovsky et al. | 208/10 |
| 4,081,361 | 3/1978 | Hildebrand et al. | 208/10 |
| 4,134,822 | 1/1979 | Wood et al. | 208/10 |
| 4,266,083 | 5/1981 | Huang | 208/10 X |
| 4,294,685 | 10/1981 | Kim et al. | 208/10 |
| 4,330,392 | 5/1982 | Bearden, Jr. et al. | 208/10 |
| 4,333,815 | 6/1982 | Vermeulen et al. | 208/10 |
| 4,338,183 | 7/1982 | Gatsis | 208/10 |
| 4,348,270 | 9/1982 | Bearden, Jr. et al. | 208/10 |
| 4,353,791 | 10/1982 | Pellet | 208/10 |
| 4,357,229 | 11/1982 | Bearden, Jr. et al. | 208/10 |

Primary Examiner—D. E. Gantz
Assistant Examiner—Glenn A. Caldarola
Attorney, Agent, or Firm—James R. Henes; William T. McClain; William H. Magidson

[57] ABSTRACT

A method for recovering upgraded liquid products by the hydroconversion of coal, coke, lignite, petroleum fractions, biomass, tar sands bitumen and shale oil are disclosed. In particular, the catalyst composition employed consists of a Group VIB metal component and a highly dispersed tin component.

19 Claims, 3 Drawing Figures

HYDROCARBON CONVERSION METHOD

BACKGROUND OF THE INVENTION

1. Field of the Invention

This invention relates generally to a hydrocarbon conversion catalyst and method and more particularly concerns a catalyst and method for recovering upgraded liquid products from coal, coke, lignite, petroleum fractions, biomass, tar sands bitumen and shale oil.

2. Description of the Prior Art

It is generally desirable to provide a catalyst having a high level of small- or intermediate-sized pores because, for a given total pore volume, distribution thereof in many smaller pores gives a relatively higher surface area than distribution thereof in a smaller number of relatively larger pores. However, small pores are more susceptible to plugging than are larger pores, and thus if insufficient large pores are present, catalyst activity often declines substantially during use. If catalyst activity declines too rapidly, excessive losses in efficiency and/or increases in catalyst replacement costs are incurred. Thus, sufficient large and small pores must be present.

For example, Kim et al., U.S. Pat. Nos. 4,257,922 and 4,294,685, disclose a catalyst comprising a catalytically active substance on support particles having a bimodal pore distribution, with a peak concentration of small pores having diameters below about 600 Å and a peak concentration of larger pores having diameters above about 600 Å, the average diameter of the smaller pores in the range of 100–200 Å, and the average diameter of the larger pores being in excess of 1,000 Å, and the catalyst having at least 5% of the total pore volume in the larger pores and at least 70% of the total pore volume in the smaller pores. This catalyst is disclosed as being suitable for the hydroconversion of coal solids to liquid and gaseous products.

Hensley et al., U.S. Pat. No. 4,225,421, disclose a similar bimodal catalyst consisting essentially of at least one active hydrogenation metal selected from Group VIB deposited on a support comprising alumina wherein the catalyst has a surface area within the range of from about 140 to about 300 m$^2$/gm, a total pore volume based upon measurement by mercury penetration within the range of from about 0.4 cc/gm to about 1.0 cc/gm, and comprising about 60% to about 95% of its micropore volume in micropores having diameters within the range of from about 50 Å to about 200 Å, 0% to about 15% of its micropore volume in pores having diameters within the range of about 200 Å to about 600 Å and about 3% to about 30% of the total pore volume based upon mercury penetration in macropores having diameters of at least 600 Å. The catalyst is disclosed for use in a process for hydrodemetallation and hydrodesulfurization of hydrocarbon feedstocks containing asphaltenes and metals, such as crude oils, topped crude oils, and petroleum hydrocarbon resids, both atmospheric and vacuum resids, oils obtained from tar sands, and resids derived from tar sands oil.

The aforesaid Kim et al. patents disclose a molybdenum component as a suitable catalytically active substance and state that other known catalysts such as nickel and/or cobalt can be employed as promoters for the molybdenum. However, Kim et al. contain no suggestion to promote the catalytic activity of molybdenum with a tin, zinc, lead or vanadium component.

Thus far, no one has disclosed a supported Group VIB metal component and a supported tin, zinc, lead or vanadium component and support particles having specific physical properties.

Kiovsky et al., U.S. Pat. No. 3,668,109, disclose a continuous liquid phase tin chloride catalyst for use in the hydroconversion of organic materials, particularly solid or very high boiling organic materials, by contacting such materials with hydrogen at an elevated temperature in the presence of such catalyst. Kiovsky et al., U.S. Pat. Nos. 3,663,452 and 3,725,239, disclose a catalyst comprising a complex salt of a tin or zinc halide and ammonium chloride supported on alumina for use in increasing the rate of hydrogenation of hydrogenatable materials, such as petroleum fractions. However, such disclosures do not indicate an appreciation of the importance of the physical properties of the catalyst with regard to its activity and the maintenance of its activity over an extended period of operation.

OBJECTS OF THE INVENTION

It is therefore a general object of the present invention to provide an improved hydrocarbon conversion catalyst and method which meet the aforementioned requirements.

More particularly, it is an object of the present invention to provide an improved hydrocarbon conversion catalyst and method which provide improved desulfurization and denitrogenation activity and high activity for the conversion of a carbonaceous material to toluene- and tetrahydrofuran-soluble products.

It is another object of the present invention to provide an improved hydrocarbon conversion catalyst and method which afford a high yield of products in the distillate range relative to the yield of products in the resid range and which involve the consumption of relatively small amounts of hydrogen in the conversion of a carbonaceous material.

It is also an object of the present invention to provide an improved hydrocarbon conversion catalyst and method which minimize catalyst deactivation.

Other objects and advantages of the invention will become apparent upon reading the following detailed description and appended claims and upon reference to the accompanying drawings.

SUMMARY

The present invention pertains to a hydrocarbon conversion catalyst composition comprising a Group VIB metal component and a promoter comprising at least one of a tin component, a zinc component, a lead component, and a vanadium component on support particles with each particle having a surface area of from about 140 to about 300 m$^2$/gm, a total pore volume by mercury penetration measurement of from about 0.4 cc/gm to about 1.0 cc/gm, a bimodal pore distribution with at least about 3% of the total pore volume in macropores having pore diameters greater than 600 Å and at least about 60% of its total pore volume in micropores having ore diameters less than 600 Å, with an average micropore diameter of from about 100 Å to about 200 Å, with the Group VIB metal component being in the form of the elemental metal oxide or sulfide or a mixture thereof and at a concentration level of from about 3 to about 30 weight percent, calculated as the metal oxide and based on the weight of the catalyst, and with the promoter component being in the form of a metal halide, oxide or sulfide, or a mixture thereof and at a total concentration level of from about 1 to about 50 weight percent, calculated as the metal chloride and based on the weight of the catalyst, wherein the promoter either is in its molten state on the support particles at a temperature in the range of from about 300° C. to about 500° C. or was formed on the catalyst support from a molten precursor thereof on the catalyst support, and wherein both the Group VIB metal component and the promoter are on the same particles, or the Group VIB metal component is on one set of particles, the promoter is on a second set of particles and the two sets of particles are intermixed.

The present invention is also a method for recovering upgraded liquid products from a carbonaceous material selected from the group consisting of coal, coke, lignite, petroleum fractions, biomass, tar sands bitumen and shale oil, comprising: contacting the carbonaceous material with hydrogen under hydrogenation conditions comprising a temperature in the range of from about 300° C. to about 500° C., in the presence of the aforesaid catalyst of the present invention and, when the carbonaceous material is coal, coke, lignite or biomass, in the presence additionally of a hydrogen-donor solvent.

BRIEF DESCRIPTION OF THE DRAWINGS

For a more complete understanding of this invention, reference should now be made to the embodiments described below by way of examples of the invention and to the accompanying drawings. In the drawings.

It should be understood, of course, that the invention is not necessarily limited to the particular embodiments illustrated herein.

DETAILED DESCRIPTION OF THE DRAWINGS INCLUDING PREFERRED EMBODIMENTS

Catalyst physical properties that are important from the standpoint of the attainment and maintenance of high catalytic activity include pore size distribution and surface area. A major feature of the catalyst of the present invention is that it comprises a catalyst support material having a bimodal pore distribution. The pore structure of the support material in the catalyst of the present invention comprises a concentration of the pore size distribution in a particularly important range of specified micropores and a significant fraction of macropores. The terms "micropores" and "micropore volume" are used to refer to that portion of the entire catalyst pore volume contained in pores having a diameter up to about 600 Å as determined by measurement by a nitrogen desorption technique derived from the method described by E. V. Ballou and O. K. Dollen in "Analytical Chemistry," Volume 32, page 532, 1960. The terms "macropores" and "macropore volume" are used to refer to that portion of the entire catalyst pore volume contained in pores having a diameter of at least 600 Å, as determined by measurement by a mercury penetration (porosimetry) technique based on the procedure described by Winslow and Shapiro in A.S.T.M. Bulletin, February, 1959.

While not wishing to be bound by theory, it can be speculated that the physical properties of the catalysts of the present invention are critical from the standpoint of the attainment and maintenance of high catalyst activity in that the bimodal distribution of pores provides a high micropore volume that contributes to a surface area great enough to provide a high population of active sites available for catalyzing the reactions involved in liquefaction and upgrading (for example, demetallation, desulfurization and so forth). Concentration of macropore volume in pores large enough to accommodate metals-containing components of, and reaction products of, carbonaceous feeds contributes to activity and maintenance of activity in that a high level of sites is provided in pores to which such components and products have access, and plugging of pores is minimized. The bimodal pore size distribution of the catalysts of the present invention also provides an appreciable level of macropores which serve as low surface area channels throughout the catalyst particles which facilitate rapid diffusion of such reactants and products into the smaller pores where reactions occur. It can be theorized that without the macropore network, metal sulfides and/or coke would deposit rapidly in the smaller pores near the external surface of the catalyst particles. This, in turn, would result in pore mouth plugging and catalyst deactivation. The low surface area of the macropores of the invented catalysts limits the concentration of active sites to which reactants are exposed during passage through the macropore network such that reaction in macropores is limited and access to the smaller, high surface area pores is maintained.

The BET surface area of the support material of the catalyst of the present invention ranges from 140 to about 300 m$^2$/gm. Surface areas less than 140 m$^2$/gm are disadvantageous because contact between the catalytically active sites and feed components is limited such that catalytic activity suffers. Surface areas greater than about 300 m$^2$/gm are suitable from the standpoint of ensuring access of reactants to active sites; however, mechanical strength and bulk density decrease so much that the catalyst is easily damaged during use and must be replaced rapidly.

The bimodal support material of the finished catalyst of the present invention has a BET surface area in the range of from about 140 to about 300 m$^2$/gm and a total pore volume based upon measurement by mercury penetration in the range of from about 0.4 cc/gm to about 1.0 cc/gm. From about 3% to about 40% of the total pore volume of the catalyst support material as determined by mercury penetration is in macropores having a diameter of at least 600 Å, and at least 60% of the total pore volume of the catalyst support material is in micropores having a diameter of up to 600 Å, with an average micropore diameter of from about 100 Å to about 200 Å.

Preferably the support material of the catalyst of the present invention has a surface area in the range of from about 150 to about 250 m$^2$/gm and a pore volume in the range of from about 0.5 cc/gm to about 1.0 cc/gm, from about 3% to about 30% of its total pore volume as determined by mercury penetration in macropores having diameters of at least 600 Å, from about 60% to about 95% of its micropore volume in micropores having diameters within the range of from about 50 Å to about 200 Å and up to 15% of its micropore volume in micropores having diameters in the range of from about 200 Å to about 600 Å.

The support component of the invented catalysts comprises at least one porous refractory inorganic oxide. The precise composition of the support is relatively unimportant so long as the required physical properties are attained. Examples of useful supports include alumina, silica, silica-alumina, stabilized alumina such as silica-stabilized alumina, phosphated alumina, stabilized phosphated-alumina such as silica-stabilized phosphated alumina, fluorided-alumina, alumina-aluminum phosphate, boria-alumina, magnesia-alumina, boria, magnesia, titania, zirconia, and the like. Certain of these also offer advantages in terms of ready attainment of suitable physical properties by steaming to increase the average pore diameter without appreciably decreasing pore volume. Support compositions presently preferred from the standpoint of catalyst performance are those comprising alumina. It is also preferred that the total concentration of porous refractory inorganic oxides other than alumina in the support material is less than 5 weight percent of the support material.

A gamma-alumina bimodal support and a silica-alumina bimodal support which are suitable for use as the support material in the catalyst of the present invention are presently available commercially. In addition, a variety of procedures can be employed for preparing the support particles. In general, the smaller pores are associated with the base material. The large pores can be formed by a known technique such as grinding the base material into a fine powder and then binding the particles together into spheres or extrudates. During that process, the large pores are generated. In the alternative, pore growth promoters could be employed. Pore growth promotion is accomplished by heating the material in the presence of a gas or metal compound, steaming at elevated temperatures, treating with hydrogen at elevated temperatures, or the like. In another procedure, the large pores may be introduced during preparation of the base material by the use of a strong mineral or organic acid for leaching. Still another procedure would be to introduce into the alumina structure a removable material which may be volatile or decomposable in the gases by the application of heat. For example, ammonium carbonate, naphthalene, anthracene, volatile aromatics, or the like have been employed. The amount of removable solids employed depends upon the desired pore size.

The catalyst composition of the present invention also comprises at least one Group VIB metal component on the aforesaid support material. Thus, one or more of molybdenum, tungsten, or chromium is present in the catalyst composition of the present invention. Preferably, molybdenum is present. The Group VIB metal component is in the form of the metal oxide or sulfide or a combination thereof. The total concentration of the Group VIB metal component present in the catalyst composition of the present invention is from about 3% to about 30% by weight, preferably from about 5% to about 20% by weight, calculated as the Group VIB metal oxide and based on the weight of the catalyst composition.

The catalyst composition of the present invention also comprises a promoter comprising at least one of a tin component, a zinc component, a lead component and a vanadium component in the form of a metal halide, oxide, sulfide or a combination thereof, at a total promoter concentration of from about 1% to about 50% by weight, preferably from about 2% to about 15% by weight, calculated as a metal chloride and based on the weight of the catalyst composition. Preferably the metal halide is a metal chloride.

It is an essential feature of the present invention that the promoter is highly dispersed on the surface of the catalyst support while the catalyst is being employed in the method of this invention. If the promoter is in the molten state under the temperature conditions employed in the method of the present invention, then the promoter is suitably highly dispersed in the present context. If however the promoter is not molten under the temperature conditions employed in the method of this invention but is formed on the catalyst support from a precursor thereof in its molten state on the catalyst support, then the promoter is also suitably highly dispersed for the present purposes. For example, a suitably highly dispersed promoter which is not molten at temperatures between 300° C. and 500° C. can be formed from a precursor thereof in a pretreatment step, such as calcination or presulfiding, at temperatures at which the precursor is in or passes through its molten state. While in the molten state, the promoter or the precursor thereof disperses throughout the surface of the catalyst support to a much greater extent than would be possible if it were not in the molten state. The resulting highly dispersed state of the promoter maximizes the promoter's capacity to promote the catalytic activity of the Group VIB metal component.

Thus when the promoter is one or more of the tin, zinc, lead and vanadium halides, oxides or sulfides which are molten between 300° C. and 500° C., the promoter need not be highly dispersed on the catalyst surface prior to using the catalyst in the method of this invention because the promoter will become sufficiently highly dispersed when used in the method of this invention. However, when the halide, oxide or sulfide of tin, zinc, lead or vanadium employed as the promoter is not molten at the temperatures employed in the method of this invention, such promoter must already be in a highly dispersed state on the catalyst surface before using the catalyst in the method of the present invention. A very convenient technique for effecting a high dispersion, for example, of an oxide or sulfide of tin, is to deposit a chloride of tin on the catalyst support and then calcine the catalyst in air at temperatures above about 500° C. During calcination, tin chloride melts and becomes highly dispersed and also is converted to tin oxide, which, like the highly dispersed tin chloride from which it is formed, is also highly dispersed. Subjecting this highly dispersed tin oxide to presulfiding conditions affords a highly dispersed tin sulfide.

If both the Group VIB metal component and the promoter are to be on the same support particles and unless the Group VIB metal component and the promoter are both to be in the form of metal oxides or both to be in the form of metal sulfides, then a precursor of the Group VIB metal component must be deposited on the support particles first and calcined in air to form the oxide before the promoter is deposited. Thereafter the promoter or a precursor of the promoter is deposited. If the Group VIB metal component is to be on one set of support particles and the promoter is to be on a second set of support particles or if the Group VIB metal component and the promoter are both to be in the form of metal oxides or both to be in the form of metal sulfides, then the sequence in which precursor of the Group VIB metal component and the promoter or its precursor are deposited is not important.

In general, any convenient conventional technique can be employed to deposit a precursor of the Group VIB metal component, the promoter itself or a precursor of the promoter on either the same or different support particles, depending on the final form of the catalyst composition of the present invention. One technique of depositing the Group VIB metal component and the promoter involves impregnation with a solution or solutions, usually aqueous, containing a heat-decomposable salt of a Group VIB metal and a salt of the metal in the promoter.

Following incorporation of a Group VIB metal compound or compounds into the support particles, the resulting impregnated particles are calcined by heating the Group VIB metal-containing support particles in the presence of a gas containing molecular oxygen at a temperature and for a time sufficient to convert the metal compound or compounds to metal oxides. Preferred temperatures range from about 427° C. to about 649° C. and preferred times range from about 0.5 to about 20 hours. In addition, after impregnating a tin, zinc, lead or vanadium halide on the support particles, if desired or necessary, the halide can be highly dispersed and converted to a highly dispersed oxide in a calcination step.

Prior to use in hydrocarbon conversion, the catalysts of the present invention can be subjected to a presulfiding treatment, if desired, to convert the metals in the metal components thereon to partially reduced metal sulfides which typically may be more active than the Group VIB metal oxides and than the chlorides or oxides of tin, zinc, lead and vanadium. A sulfiding pretreatment that is preferred from the standpoint of cost and convenience involves contacting a catalyst with a mixture of hydrogen and hydrogen sulfide at varying pressures and increasing temperature over a period of time. Other suitable presulfiding treatments involve contacting the catalyst with hydrogen and carbon disulfide or a light hydrocarbon oil containing sulfur compounds at elevated temperature for a period of time sufficient to effect conversion of the metal components to metal sulfides.

The method of the present invention comprises contacting a carbonaceous material susceptible to upgrading with hydrogen in the presence of the above-described catalyst composition under hydrogenation conditions. Preferably the carbonaceous material is selected from the group consisting of coal, coke, lignite, petroleum fractions, biomass, tar sands bitumen and shale oil. If the carbonaceous material is coal, coke, lignite or biomass, a hydrogen-donor solvent is also employed. More preferably the carbonaceous material is coal and the petroleum fraction is a resid fraction.

When a hydrogen-donor solvent is employed, the carbonaceous material is contacted with the hydrogen-donor solvent at a weight ratio in the range preferably of from about 1:4 to about 7:3.

A suitable hydrogen-donor solvent for use in the method of this invention contains at least 0.8 percent, and generally from about 1.2 to about 3 percent, and greater, of donatable hydrogen, based on the weight of the solvent. A suitable hydrogen-donor solvent thus generally contains about 30 weight percent, and usually about 50 weight percent, or greater, of an admixture of hydrogen-donor compounds, or precursors thereof which when hydrogenated are adequate to supply the necessary hydrogen at reaction conditions, based on the total weight of the solvent. Hydrogen-donor compounds are well-known and comprise polycyclic aromatic hydrocarbons which are partially hydrogenated, generally having one or more of the nuclei at least partially saturated. Preferred hydrogen-donor compounds are added to, or generated in situ from precursors contained within a suitable solvent donor vehicle, these including indene, dihydronaphthalene, $C_{10}$–$C_{12}$ tetrahydronaphthalenes, hexahydrofluorine, the dehydro-, tetrahydro-, hexahydro-, and octahydrophenanthrenes, $C_{12}$–$C_{13}$ acenaphthenes, the tetrahydro-, hexahydro- and decahydropyrenes, the ditetra- and octahydroanthracenes, and other derivatives of partially saturated aromatic compounds. In terms of hydrogen-donor potential, the hydrogen-donor solvent performs as a hydrogen-donor solvating medium. A preferred type of solvent is a thermally stable, polycyclic aromatic and hydroaromatic mixture which results from one or more petroleum refining operations, or is an indigenous liquid produced fraction which is recycled in the invention process or a liquid product produced from some other coal liquefaction technique such as Solvent Refined Coal-II. The hydrogen-donor solvent nominally has a boiling point above about 450° F. An essential feature of a hydrogen-donor solvent that is suitable for use in the method of this invention is that the solvent is substantially in the liquid state under the conditions employed in the method of this invention.

Illustrative of a suitable hydrogen-donor solvent is a petroleum refinery highly aromatic resid such as fluidized catalytic cracker and catalytic reforming bottoms which contain a substantial proportion of polycyclic aromatic hydrocarbon constituents such as naphthalene, dimethylnaphthalene, anthracene, phenanthrene, fluorene, chrysene, pyrene, perylene, diphenyl, benzothiophene, tetralin, dihydronaphthalene, and the like. Such refractory petroleum media are resistant to conversion to lower molecular products by conventional nonhydrogenative procedures. Typically, these petroleum refinery residual and recycle fractions are hydrocarbonaceous mixtures having an average hydrogen-to-carbon ratio above about 0.7:1 and an initial boiling point above about 450° F.

A FCC main column bottoms refinery fraction is a highly preferred hydrogen-donor solvent for the practice of the present invention process. FCC main tower bottoms are obtained by the catalytic cracking of gas oil in the presence of a solid porous catalyst. A more complete description of the production of this petroleum fraction is disclosed in U.S. Pat. No. 3,725,240. A FCC main column bottoms is an excellent hydrogen-donor solvent medium for solubilization of carbonaceous materials because it has a unique combination of physical properties and chemical constituency. A critical aspect of solvating ability is the particular proportions of aromatic and naphthenic and paraffinic moieties characteristic of a prospective hydrogen-donor solvent. A high content of aromatic and naphthenic structures in a solvent is a criterion for high solvating ability for liquefaction of carbonaceous material.

The method of the present invention is performed at a temperature in the range of from about 300° C. to about 500° C., a hydrogen partial pressure in the range of from about 14 to about 210 kilograms per square centimeter and a space velocity in the range of from about 0.1 to about 10 grams of carbonaceous material per gram of catalyst per hour. Preferably, the method of the present invention is performed at a temperature in the range of from about 400° C. to about 450° C., a hydrogen recycle or addition rate in the range of from 178 to about 3562 cubic meters of hydrogen per cubic meter of carbonaceous material and a space velocity in the range of from about 0.5 to about 5 grams of carbonaceous material per gram of catalyst per hour.

Fixed and expanded bed and slurry phase operations are contemplated for the practice of the method of the present invention. In fixed bed processes, the carbonaceous feed material and a hydrogen-containing gas are passed through a packed bed of catalyst under conditions, such as temperature, pressure, hydrogen flow rate, space velocity, etc., that vary somewhat depending on the choice of feed, reactor capacity and other factors known to persons of skill in the art. A catalyst in the form of spheres or extrudate, preferably about 0.25 to about 3.5 millimeters in diameter, give good results in terms of promoting adequate contact between catalyst and feed components while avoiding excessive pressure drop through a catalyst bed. More preferably, particles of about 0.79 to about 1.6 millimeters in diameter are used. Trilobe, cloverleaf, cross, and "C"-shaped catalysts such as are disclosed in commonly assigned U.S. Pat. No. 3,674,680 (Hoekstra et al.) give particularly good results in terms of maximizing catalyst efficiency and promoting a high level of contact between catalyst and feed components.

In expanded bed processes, a packed catalyst bed is expanded and mobilized by upflow of the carbonaceous feed material and hydrogen-containing gas at space velocities effective to provide adequate mobilization and expansion, and thereby promote contact between catalyst particles and reactants, without substantial carry over of catalyst particles. Preferred catalyst for expanded-bed use are extrudates of about 0.5 to about 1.3 millimeters in diameter, with about 0.79 millimeter being most preferred.

The present invention will be more clearly understood from the following specific examples.

EXAMPLE 1

24 grams of $SnCl_2.2H_2O$ were dissolved in 160 grams of water by adding dilute hydrochloric acid dropwise to the water with stirring until a clear solution resulted. The solution was then cooled until it became cloudy. The solution was next mixed with 176 grams of Amocat 1B whose composition and properties are presented in Table 1 and which was obtained from the Davison Chemical Division of W. R. Grace and Company. The resulting mixture was dried for 2 days at 121° C.

TABLE 1

| Properties | Mo-free Support | Amocat 1B |
|---|---|---|
| Surface area (m.$^2$/gm.) | 198 | 189 |
| Average micropore diameter (Å) | 115 | 105 |
| Total pore volume (cc./gm.) | 0.848 | 0.702 |
| Micropore (under 600 Å) volume (cc./gm.) | 0.714 | 0.589 |
| Macropore (over 600 Å) volume (cc./gm.) | 0.134 | 0.113 |
| Crush strength (newtons/mm.) | 30.9 | 30.9 |
| Average length (cm.) | 0.353 | 0.356 |
| Average diameter (cm.) | 0.150 | 0.152 |
| Bulk density (g./cc.) | 0.54 | 0.665 |
| $MoO_3$ (wt. %) | 0 | 15.8 |
| $Al_2O_3$ (wt. %) | 100 | 82.7 |

EXAMPLE 2

2.5 grams of $SnCl_2.2H_2O$ were dissolved in 40 grams of water by adding about 40 drops of hydrochloric acid with stirring and heating until a clear solution resulted. The resulting solution was mixed thoroughly with 47.5 grams of Amocat 1B having particle sizes in the range of 60–100 mesh (U.S. Sieve Series). The resulting mixture was dried for 2 days at 121° C.

EXAMPLE 3

The procedure of Example 2 was repeated except that 6 grams of $SnCl_2.2H_2O$ and 44 grams of the 60–100 mesh Amocat 1B were employed.

EXAMPLE 4

The procedure of Example 2 was repeated except that 12.5 grams of $SnCl_2.2H_2O$ and 37.5 grams of the 60–100 mesh Amocat 1B were employed.

EXAMPLE 5

A composition prepared as in Example 2 was calcined in air at 510° C. for 3 hours.

EXAMPLE 6

A composition prepared as in Example 3 was calcined in air at 510° C. for 3 hours.

EXAMPLE 7

A composition prepared as in Example 4 was calcined in air at 510° C. for 3 hours.

EXAMPLE 8

The procedure of Example 2 was repeated except that 5 grams of $SnCl_2.2H_2O$, 50.6 grams of water and 45 grams of the 60–100 mesh, molybdenum-free support of Amocat 1B were employed.

EXAMPLE 9

The procedure of Example 8 was repeated except that 12.56 grams of $SnCl_2.2H_2O$, 41 grams of water and 37.83 grams of the 60–100 mesh support material were employed.

EXAMPLE 10

To 95 grams of melted $SnCl_2.2H_2O$ were added 50 grams of the 60–100 mesh support material. After mixing the resulting combination, the mixture was cooled.

The compositions of the catalysts produced in Examples 1–10 are presented in Table 2.

TABLE 2

| Catalyst from Example No. | Catalyst Composition (wt. %) | | | |
|---|---|---|---|---|
| | $SnCl_2$ | $SnO_x$ | $MoO_3$ | $Al_2O_3$ |
| 1 | 10 | — | 14 | 76 |
| 2 | 4 | — | 15 | 81 |
| 3 | 10 | — | 14 | 76 |
| 4 | 22 | — | 12 | 66 |
| 5 | — | 4[1] | 15[1] | 81[1] |
| 6 | — | 10[1] | 14[1] | 76[1] |
| 7 | — | 22[1] | 12[1] | 66[1] |
| 8 | 9 | — | — | 91 |
| 9 | 22 | — | — | 78 |
| 10 | 62 | — | — | 38 |

[1]Based on a calculation of the $SnO_x$ concentration as $SnCl_2$.

EXAMPLES 11-20

In each of Examples 11-20, a slurry of 10 grams of a 60-100 mesh (U.S. Sieve Series) catalyst and 150 grams of 60+ mesh coal in about 300 grams of a hydrogen-donor solvent was charged to a stirred 1-liter Magnedrive packless autoclave (Autoclave Engineers, Inc.). A constant hydrogen partial pressure of 141 kilograms per square centimeter was maintained in the reactor with a continuous flow of hydrogen through the reaction at 3 standard cubic feet per hour. The temperature of the reactor was raised rapidly to 399° C. and held at that temperature for a reaction time of 35 minutes while the reactor contents were stirred at 1800 revolutions per minute. After the autoclave had been cooled to room temperature and depressurized, liquid product, coal residue (unreacted coal and solid reaction product) and catalyst were removed. The mixture of catalyst, coal residue and liquid product was extracted with toluene, and the resulting mixture was then separated by vacuum filtration. The resulting extract was distilled to remove toluene therefrom, and the remaining substantially toluene-free extract was combined with the aforesaid liquid product to form the total liquid product. The remaining mixture of catalyst and toluene-extracted coal residue was toluene-soxlet extracted, dried and weighed to obtain the final dry weight ($S_f$) of catalyst and coal residue.

The degree of conversion of the coal charged was based on the measurement of unreacted coal and was calculated on a moisture- and ash-free basis as follows:

$$\%C = 100 \times (S_i - S_f)/R$$

%C is the weight percent of coal converted on a moisture- and ash-free basis. $S_i$ is the initial dry weight of catalyst and coal charged to the autoclave, less the water content of the coal. R is the weight of the coal charged to the autoclave, less the water and ash content of the coal. Subtracting $S_f$ from $S_i$ eliminates any contribution of the catalyst weight or ash content of the coal to the determination of % C.

Liquid product quality was determined by analysis of the total liquid product for sulfur and nitrogen and correction of the analyses for any residual benzene or toluene in the total liquid product to obtain the sulfur content (%S) and nitrogen content (%N) of the total liquid product.

Evaluation of catalyst performance was done by comparison of %C, %S and %N for each catalyst to values of %C, %S and %N, respectively, for a reference catalyst, namely American Cyanamid's HDS-1442A, as follows, to determine relative activity (R.A.), relative sulfur level (R.S.) and relative nitrogen level (R.N.):

$$R.A. = \frac{\% \text{ C for test catalyst}}{\% \text{ C for reference catalyst}}$$

$$R.S. = \frac{\% \text{ S for test catalyst}}{\% \text{ S for reference catalyst}}$$

$$R.N. = \frac{\% \text{ N for test catalyst}}{\% \text{ N for reference catalyst}}$$

In each of Examples 11-20, the coal employed was Illinois No. 6 whose composition is shown in Table 3 under the heading "Batch 1." The hydrogen-donor solvent employed in each of Examples 11-20 was Panasol AN-3, about 90% of which is two- and three-ring aromatics and the remaining 10% of which is alkylbenzenes and partially hydrogenated polycyclics. Panasol AN-3 boils between 198° C. and 306° C. and is recovered from the distillation bottoms after high severity catalytic reforming of naphtha. Amocat IB and the catalysts prepared in Examples 2-10 are employed in Examples 11-20. The particular catalyst employed in, and the results from, each of Examples 11-20 are indicated in Table 4.

TABLE 3

Illinois No. 6 Coal

| Component | Concentration (wt. %) Batch 1 | Batch 2 |
|---|---|---|
| Moisture | 3.31 | 3.64 |
| Ash | 10.78 | 10.81 |
| Nitrogen | 1.20 | 1.31 |
| Hydrogen (Organic) | 4.74 | 4.37 |
| Oxygen (excluding the oxygencontent of water) | 9.92 | 10.56 |
| Carbon | 66.90 | 67.42 |
| Sulfur | 3.15 | 2.61 |
| Atomic H/C, Organic H Only | 0.844 | 0.77 |

TABLE 4

| Example No. | Catalyst from Example No. | % C | R.A. | % S | R.S. | % N | R.N. |
|---|---|---|---|---|---|---|---|
| 11 | Amocat 1B | 58.65 | 0.99 | 1.92 | 1.23 | 2.38 | 1.32 |
| 12 | 2 | 61.23 | 1.07 | 1.50 | 0.96 | 1.55 | 0.85 |
| 13 | 3 | 61.70 | 1.08 | 1.48 | 0.94 | 1.62 | 0.89 |
| 14 | 4 | 64.82 | 1.10 | 1.64 | 1.08 | 1.49 | 0.82 |
| 15 | 5 | 60.21 | 1.03 | 1.52 | 0.97 | 1.32 | 0.73 |
| 16 | 6 | 60.45 | 1.04 | 1.47 | 0.94 | 1.34 | 0.74 |
| 17 | 7 | 62.09 | 1.08 | 1.49 | 0.95 | 1.59 | 0.91 |
| 18 | 8 | 47.16 | 0.82 | 2.06 | 1.32 | 1.69 | 1.10 |
| 19 | 9 | 54.51 | 0.94 | 1.92 | 1.23 | 1.69 | 1.10 |
| 20 | 10 | 77.17 | 1.32 | 1.73 | 1.11 | 1.77 | 1.15 |

Comparison of the results presented in Table 4 indicates increased, and therefore improved, values of the relative activities (R.A.) for catalysts of the present invention containing both the molybdenum component and either the tin chloride or tin oxide component relative to the values of the relative activities of the comparison catalysts containing only the molybdenum component (Amocat IB employed in Example 11) or containing only the tin chloride or tin oxide component (catalysts of Examples 8-10 employed in Examples 18-20). Similarly, comparison of the results presented in Table 4 indicates generally decreased, and therefore improved, values of the relative sulfur levels (R.S.) and the relative nitrogen levels (R.N.) of the liquefaction products obtained using the aforesaid catalysts of the present invention relative to the values of the relative sulfur levels and relative nitrogen levels of the liquefaction products obtained using the aforesaid comparison catalysts. Furthermore, the results in Table 4 indicate that calcination of the catalysts of the present invention affords an improvement in desulfurization activity at only the highest concentration of tin oxide in the catalyst and an improvement in denitrogenation activity at only the two lowest concentrations of tin oxide in the catalyst. Although tin oxide was not molten under the temperature conditions of these examples, it was formed from molten and highly dispersed tin chloride during calcination of tin chloride and hence was itself sufficiently dispersed.

EXAMPLE 21

In Example 21, the catalyst prepared in Example 1 was first dried in air at 538° C. and then 60 cubic centimeters (approximately 35 grams) of the catalyst were loaded into a basket in a stirred 370 cubic centimeter reactor. The catalyst was fixed in place in the reactor by filling the remaining space in the reactor with glass beads and glass wool. After the reactor was sealed, the reactor was flushed with a stream of nitrogen and heated to 260° C., and then the nitrogen was replaced by a stream containing 8 volume percent of hydrogen sulfide in hydrogen flowing at 112 liters per hour. Sulfiding of the catalyst with the hydrogen sulfide-hydrogen stream for 0.5 hour provided about 0.15 gram of sulfur per gram of catalyst. The hydrogen sulfide-hydrogen stream was then replaced by a stream of hydrogen, and the reactor pressure was raised to 141 kilograms per square centimeter. When the aforesaid reactor pressure was reached, a stream of hydrogenated anthracene oil containing 0.5 weight percent of methyl disulfide at 400 grams per hour and hydrogen at 225 liters per hour was passed through the reactor while it was heated to 440° C. When the temperature reached 440° C., the stream of anthracene oil was replaced by a slurry of 400+ mesh (U.S. Sieve Series) coal in a hydrogen-donor solvent.

A constant hydrogen pressure of 141 kilograms per square centimeter was maintained in the reactor with a continuous flow of hydrogen through the reactor at 225 liters per hour. The reactor was maintained at a temperature of 440° C., and the reactor contents were stirred at 1500 revolutions per minute. The space velocity was about 3 grams of coal per gram of catalyst per hour, and the residence time of the slurry in the reactor was about 44 minutes.

The system was operated continuously over a period of days and, at various intervals during this period, product leaving the reactor was collected and analyzed and its solubilities in tetrahydrofuran, benzene and hexane were determined. The extent of conversion of the coal to products which are soluble in tetrahydrofuran, benzene and hexane, one measure of catalyst performance, was calculated using the following relationships:

For tetrahydrofuran-soluble product $$X = \frac{(100 - M_c) - (A_c/A_{thf})}{100 - A_c - M_c} \cdot 100$$

For benzene- and hexane-soluble product $$X = \frac{(100 - M_c) - (I_a/I_{thf})(A_c/A_{thf})}{(100 - A_c - M_c)} \cdot 100$$

$M_c$ is the weight percent of moisture in the coal feed. $A_c$ is the weight percent of ash in the coal feed. $I_{thf}$ is the weight percent of tetrahydrofuran-insoluble material in the liquid product. $A_{thf}$ is the weight percent of ash in the tetrahydrofuran-insoluble portion of the liquid product. $I_a$ is the weight percent of benzene- or hexane-insoluble material in the liquid product.

In Example 21, the coal employed was Illinois No. 6 whose composition is shown in Table 3 under the heading "Batch 2." The hydrogen-donor solvent employed in Example 21 was a heavy distillate fraction of the product of the Solvent Refined Coal-II liquefaction process and was obtained from Pittsburgh and Midway Mining Co. This hydrogen-donor solvent boils between 260° C. and 538° C. and contains a high concentration of partially hydrogenated multi-ring aromatic compounds. The results from Example 21 are presented in Tables 5 and 6.

As indicated hereinabove, the degree of conversion to tetrahydrofuran-soluble material ($X_{thf}$), to benzene-soluble material ($X_{benzene}$), and to n-hexane-soluble material ($X_{n-C_6}$), which are presented in Table 6 are measures of catalyst performance. Another measure of catalyst performance presented in Table 6 is the ratio of the yield of the distillate fraction of the product to the yield of the resid fraction of the product. The greater the yield of the more valuable distillate fraction relative to the yield of the resid fraction, the better is the catalyst performance. The distillate fraction and resid fraction are defined as the fraction boiling below 520° C. and the fraction boiling above 520° C., respectively.

TABLE 5

| Sample No. | Hours on Stream | Residence Time (min.) | $I_{thf}$ | $I_{benzene}$ | $I_{n-C_6}$ | $A_{thf}$ |
|---|---|---|---|---|---|---|
| 1 | 15 | 53.5 | | 6.68 | 14.91 | |
| 2 | 21 | 42.8 | 4.90 | 8.25 | 16.10 | 61.68 |
| 3 | 39 | 43.5 | | 8.24 | 16.53 | |
| 4 | 45 | 44.1 | 4.73 | 8.08 | 16.44 | 61.28 |
| 5 | 63 | 49.1 | | 8.19 | 15.59 | |
| 6 | 69 | 44.2 | 4.95 | 9.01 | 17.32 | 59.96 |
| 7 | 86 | 43.9 | | 9.17 | 17.34 | |
| 8 | 92 | 44.2 | 5.11 | 9.32 | 17.68 | 59.64 |
| 9 | 112 | 41.5 | | 9.29 | 18.40 | |
| 10 | 119 | 44.4 | 5.01 | 9.69 | 18.05 | 59.36 |
| 11 | 136 | 44.5 | | 8.96 | 20.03 | |
| 12 | 142 | 43.3 | 5.00 | 9.93 | 18.19 | 58.10 |
| 13 | 159 | 41.8 | | 9.47 | 19.23 | |
| 14 | 166 | 43.6 | 5.00 | 10.15 | 18.39 | 59.27 |
| 15 | 183 | 45.5 | | 9.12 | 18.49 | |
| 16 | 189 | 44.0 | 5.31 | 10.53 | 18.83 | 58.41 |
| 17 | 207 | 44.3 | | 9.52 | 19.68 | |
| 18 | 213 | 44.3 | 5.05 | 10.38 | 18.84 | 58.54 |
| 19 | 231 | 41.5 | | 10.04 | 19.71 | |
| 20 | 237 | 41.4 | 5.16 | 10.57 | 19.39 | 57.58 |

TABLE 6

| Sample No. | Conversion to Solubles | | | Resid Yield[1] | Dist.-to-Resid Yield Ratio | Hydrogen Used %[2] |
|---|---|---|---|---|---|---|
| | $X_{thf}$ | $X_{benzene}$ | $X_{n-C_6}$ | | | |
| 1 | | 75.37 | 43.06 | | | |
| 2 | 90.00 | 74.94 | 37.50 | 10.00 | 0.93 | 4.71 |
| 3 | | 74.50 | 35.49 | | | |
| 4 | 90.57 | 74.89 | 35.91 | 11.43 | 0.70 | 5.09 |
| 5 | | 71.15 | 39.88 | | | |
| 6 | 89.52 | 70.47 | 31.80 | 12.08 | 0.59 | 4.58 |
| 7 | | 69.94 | 31.71 | | | |
| 8 | 88.77 | 69.03 | 30.12 | 9.86 | 0.93 | 4.59 |
| 9 | | 70.88 | 26.76 | | | |
| 10 | 89.20 | 67.15 | 28.40 | 11.87 | 0.61 | 4.50 |
| 11 | | 70.49 | 19.15 | | | |
| 12 | 89.44 | 66.75 | 27.74 | 12.94 | 0.48 | 4.21 |
| 13 | | 69.84 | 22.89 | | | |
| 14 | 89.38 | 65.51 | 26.81 | 11.87 | 0.61 | 3.88 |
| 15 | | 69.14 | 26.34 | | | |
| 16 | 87.88 | 63.52 | 24.75 | 11.94 | 0.58 | 3.97 |
| 17 | | 68.02 | 20.79 | | | |
| 18 | 89.03 | 64.01 | 24.71 | 10.30 | 0.85 | 3.88 |
| 19 | | 67.37 | 20.65 | | | |
| 20 | 89.02 | 64.96 | 22.14 | 13.39 | 0.42 | 3.65 |

[1] Weight percent of liquid product
[2] Weight percent of coal feed on a moisture- and ash-free basis Another measure of catalyst performance presented in Table 6 is the level of consumption of hydrogen. The lower the hydrogen consumption, the better is the catalyst performance. Ideally hydrogen is consumed in only those reactions which remove undesirable heteroatoms and reduce the viscosities and boiling points of the liquefaction products to desirable levels. For example, the formation of low molecular weight gaseous hydrocarbons and the extensive saturation of liquid products are not considered to be desirable uses of hydrogen. It is not possible to determine the hydrogen consumption by the difference between the hydrogen feed and effluent with any degree of certainty because only small amounts of hydrogen are consumed relative to the large hydrogen feedstream. Instead it is necessary to determine the change in hydrogen content of the liquid streams entering and leaving the reactor and include the hydrogen contained in the hydrocarbons and heteroatom-containing compounds leaving the reactor in the product gas stream.

Figure 1:
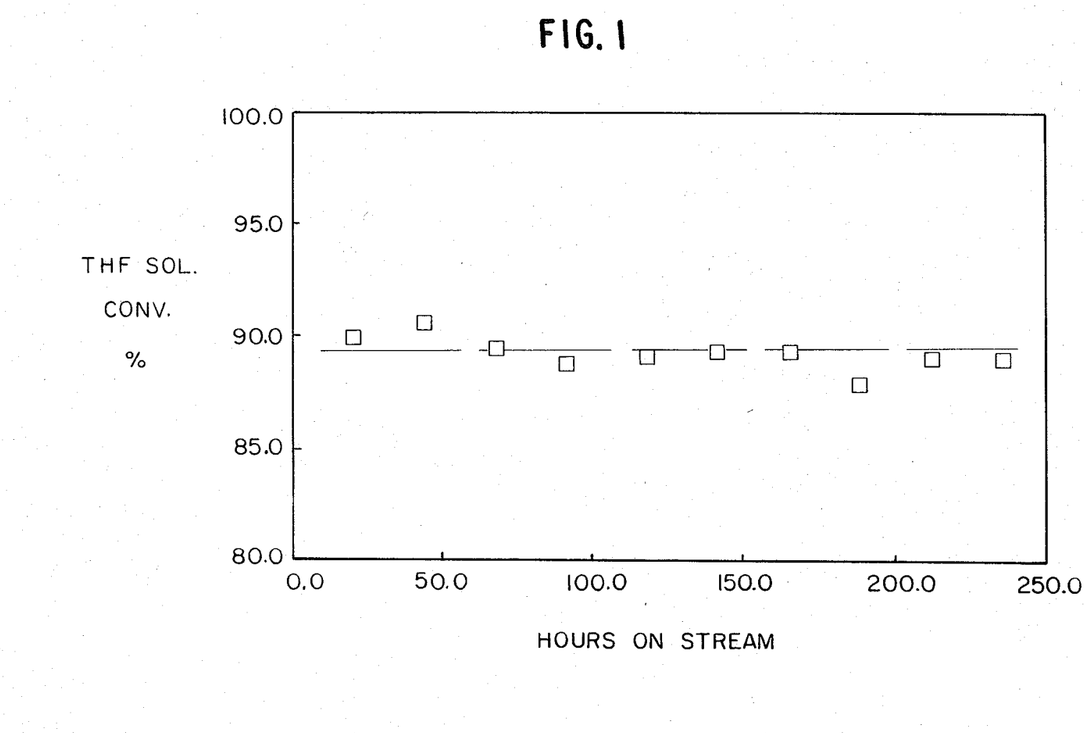
FIG. 1 is a plot of the extent of conversion in Example 21 of coal to products which are soluble in tetrahydrofuran versus the time on stream.

The values of the conversion to tetrahydrofuran-soluble material ($X_{thf}$) for Example 21 are plotted versus time on stream in FIG. 1. The ratios of the yield of the distillate fraction of the products-to-the yield of the resid fraction of the products for Example 21 are plotted versus the time on stream in FIG. 2. The values for the percentage of hydrogen consumption for Example 21 are plotted versus the time on stream in FIG. 3.

Figure 2:
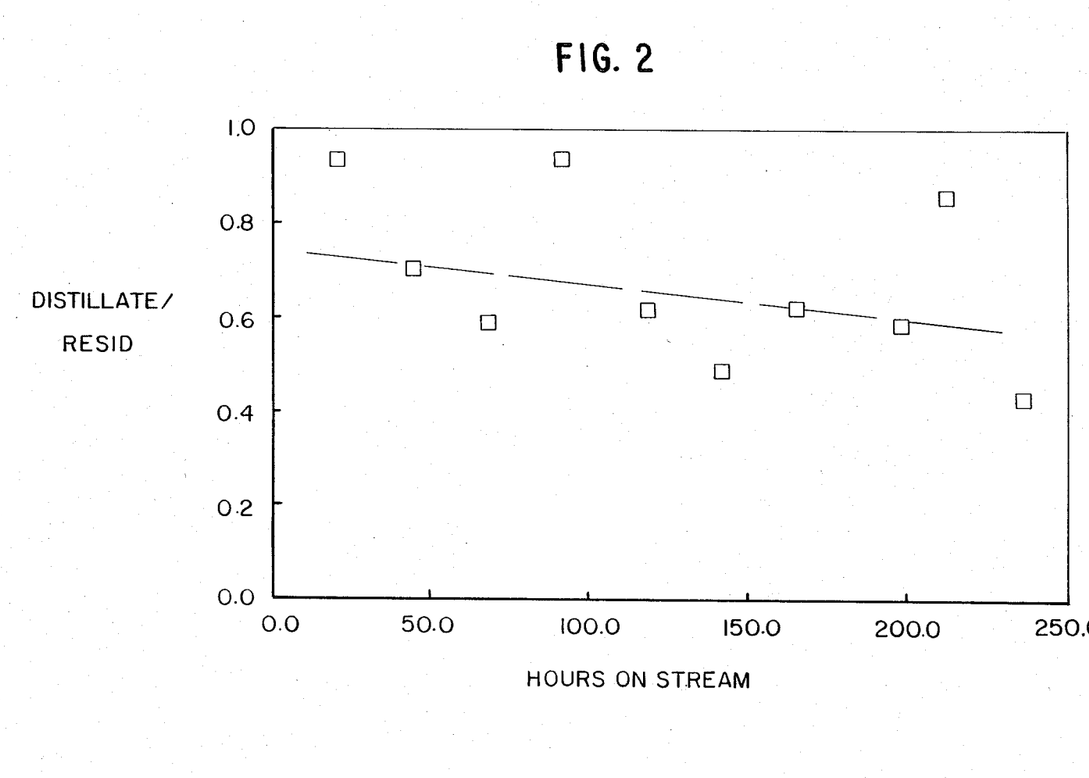
FIG. 2 is a plot of the ratio of the distillate fraction-to-the resid fraction in the liquefaction products in Example 21 versus the time on stream.
Figure 3:
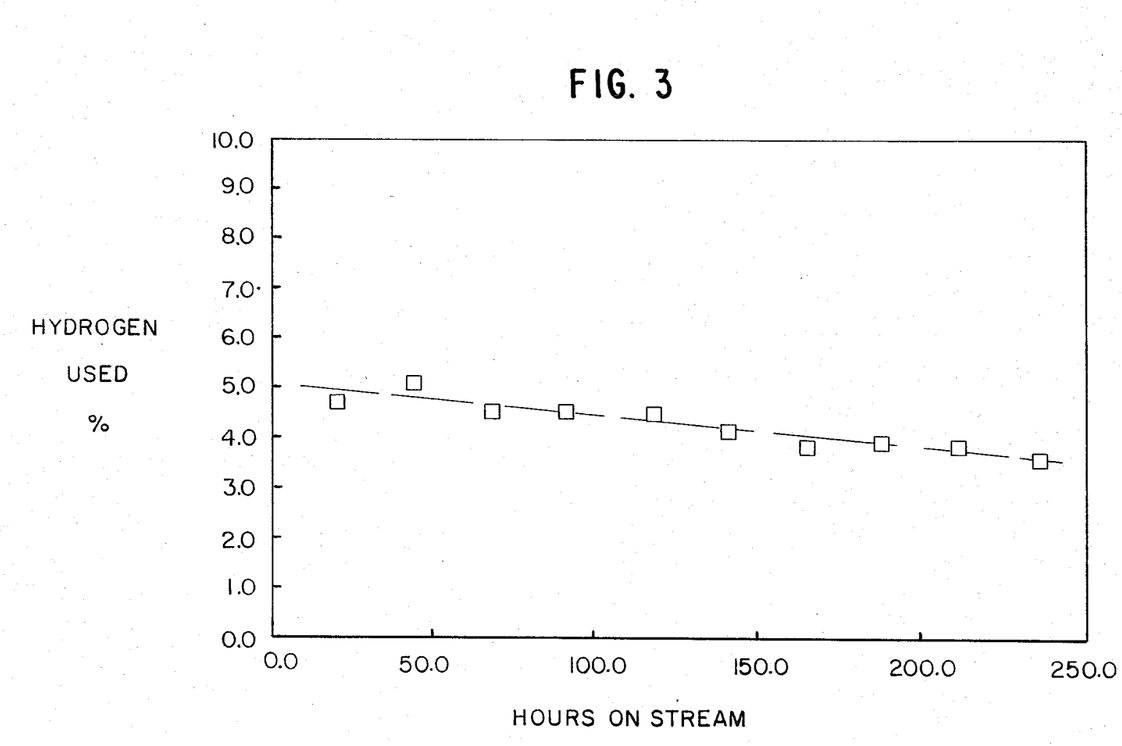
FIG. 3 is a plot of the percentage of hydrogen consumed in Example 21 versus the time on stream.

The results presented in Table 6 and plotted in FIGS. 1-3 illustrate high degrees of coal conversion to tetrahydrofuran-soluble products, high ratios of the yields of distillate fractions-to-the yields of resid fractions in the conversion products and low percentages of hydrogen consumptions for the method of the present invention employing the catalyst of the present invention. Furthermore, FIGS. 1-3 illustrate that these values are very stable over the duration of Example 21 and that therefore the catalyst deactivates only minimally.

In addition, a run performed using the procedure and conditions of Examples 5-7 except with a catalyst composition comprising a mixture of (1) particles comprising tin oxide on the alumina support material employed in Examples 8-10 and of (2) particles comprising molybdenum oxide on the same alumina support. The results for this run included values for R.A., R.S. and R.N. of 1.09, 0.93 and 0.85, respectively, which are comparable to the values of R.A., R.S. and R.N. for Examples 2-7 and indicate that the Group VIB metal component and the promoter can be on separate particles.

From the above description, it is apparent that the objects of the present invention have been achieved. While only certain embodiments have been set forth, alternative embodiments and various modifications will be apparent from the above description to those skilled in the art. These are considered equivalents and within the spirit and scope of the present invention.

What is claimed is:

1. A method for recovering upgraded liquid products from a carbonaceous material selected from the group consisting of coal, coke, lignite, petroleum fractions, biomass, tar sands bitumen and shale oil, comprising: contacting the carbonaceous material with hydrogen under hydrogenation conditions comprising a temperature in the range of from about 300° C. to about 500° C. in the presence of a hydrocarbon conversion catalyst comprising a Group VIB metal component and a highly dispersed promoter comprising a tin component on support particles having a surface area of from about 140 to about 300 m²/gm, a total pore volume by mercury penetration measurement of from about 0.4 cc/gm to about 1.0 cc/gm, a bimodal pore distribution with at least about 3% of its total pore volume in macropores having pore diameters greater than 600 Å and at least about 60% of its total pore volume in micropores having pore diameters less than 600 Å, with an average micropore diameter of from about 100 to about 200 Å and an average macropore diameter in excess of 1,000 Å, with the Group VIB metal component being in the form of the metal oxide or sulfide or a mixture thereof and at a concentration level of from about 3 to about 30 weight percent calculated as the metal oxide and based on the weight of the catalyst, and with the promoter component being in the form of a metal chloride, oxide, sulfide or a mixture thereof and at a total concentration level of from about 1 to about 50 weight percent, calculated as the metal chloride and based on the weight of the catalyst wherein the promoter either is in its molten state on the support particles at a temperature in the range of form about 300° C. to about 500° C. or was formed on the catalyst support from a molten precursor thereof on the catalyst support, and wherein, when the carbonaceous material is coal, coke, lignite or biomass, the carbonaceous material, hydrogen, and catalyst are contacted in a hydrogen-donor solvent.

2. The method of claim 1 wherein the carbonaceous material and hydrogen donor solvent are combined in a weight ratio of from about 1:4 to about 7:3.

3. The method of claim 1 wherein the carbonaceous material is coal.

4. The method of claim 1 wherein the hydrogen partial pressure is in the range of from about 14 to about 210 kilograms per square centimeter.

5. The method of claim 1 wherein the space velocity is in the range of from about 0.1 to about 10 grams of carbonaceous material per gram of catalyst per hour.

6. The method of claim 1 wherein the Group VIB metal component comprises molybdenum.

7. The method of claim 6 wherein the metal of the Group VIB metal component is molybdenum.

8. The method of claim 1 wherein the promoter is tin chloride or oxide.

9. The method of claim 1 wherein the support comprises alumina.

10. The method of claim 9 wherein the support is alumina.

11. The method of claim 1 wherein the support has a surface area of from about 150 to about 250 m²/gm.

12. The method of claim 1 wherein the total pore volume of the support by mercury penetration measurement is at least 0.5 cc/gm.

13. The method of claim 1 with from about 60% to about 95% of its micropore volume in micropores having diameters of from about 50 Å to about 200 Å, up to about 15% of its micropore volume in micropores having diameters of from about 200 Å to about 600 Å.

14. The method of claim 1 with up to 20% of its total pore volume in macropores having diameters above 600 Å.

15. The method of claim 1 with the Group VIB metal component at a level of from about 5 weight percent to about 20 weight percent, calculated as the metal oxide and based on the weight of the catalyst.

16. The method of claim 1 with the promoter at a level of from about 2 weight percent to about 15 weight percent, calculated as the metal chloride and based on the weight of the catalyst.

17. The method of claim 1 wherein both the Group VIB metal component and the promoter are on the same particles.

18. The method of claim 1 wherein both the Group VIB metal component and the promoter are on the same particles.

19. The method of claim 1 wherein the Group VIB metal component is on one set of particles, the promoter is on a second set of particles and the two sets of particles are mixed together.

* * * * *